United States Patent
Uchida et al.

(10) Patent No.: US 11,332,623 B2
(45) Date of Patent: May 17, 2022

(54) CARBON BLACK, ELECTRODE CATALYST AND FUEL CELL USING SAME, AND METHOD FOR PRODUCING CARBON BLACK

(71) Applicants: University of Yamanashi, Kofu (JP); Denka Company Limited, Tokyo (JP)

(72) Inventors: Makoto Uchida, Kofu (JP); Katsuyoshi Kakinuma, Kofu (JP); Daiki Ikeda, Omuta (JP); Yusaku Harada, Omuta (JP); Takeshi Miyakawa, Omuta (JP)

(73) Assignees: UNIVERSITY OF YAMANASHI, Yamanashi (JP); DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/779,674

(22) PCT Filed: Nov. 28, 2016

(86) PCT No.: PCT/JP2016/085131
§ 371 (c)(1),
(2) Date: Sep. 17, 2018

(87) PCT Pub. No.: WO2017/094648
PCT Pub. Date: Jun. 8, 2017

(65) Prior Publication Data
US 2019/0030514 A1    Jan. 31, 2019

(30) Foreign Application Priority Data
Nov. 30, 2015  (JP) ............................. JP2015-233050

(51) Int. Cl.
*C09C 1/54*     (2006.01)
*B01J 37/08*    (2006.01)
(Continued)

(52) U.S. Cl.
CPC ................ *C09C 1/54* (2013.01); *B01J 23/42* (2013.01); *B01J 37/08* (2013.01); *C09C 1/565* (2013.01);
(Continued)

(58) Field of Classification Search
None
See application file for complete search history.

(56) References Cited

U.S. PATENT DOCUMENTS

2015/0021525 A1*  1/2015  Naskar .................... C09C 1/482
                                                         252/502

FOREIGN PATENT DOCUMENTS

| JP | 2007-112660 A | 5/2007 |
| JP | 2007-220384 A | 8/2007 |
| JP | 2013-209504 A | 10/2013 |

OTHER PUBLICATIONS

Uchida et al., "Development of High Performance Electrocatalysts for Fuel Cell Vehicles by Nanotechnology," Transactions of the Society of Automotive Engineers of Japan, Nov. 1, 2015, vol. 69, No. 11, pp. 63-71.
(Continued)

*Primary Examiner* — Guinever S Gregorio
(74) *Attorney, Agent, or Firm* — Oliff PLC (57) ABSTRACT

An electrode catalyst support, capable of improving the power of a fuel cell, and an electrode catalyst and a solid polymer fuel cell using the same.
Provided is carbon black wherein pores which are at most 6 nm in pore diameter have a cumulative pore volume of less than 0.25 cm$^3$/g, a specific surface area by BET is 500 to 900 m$^2$/g, and a volatile matter content is 1.0 to 10.0%. Also provided are an electrode catalyst for a fuel cell comprising a support which includes this carbon black, and a solid polymer fuel cell having the electrode catalyst.

13 Claims, 3 Drawing Sheets

(51) Int. Cl.
*H01M 8/10* (2016.01)
*H01M 4/96* (2006.01)
*C09C 1/56* (2006.01)
*B01J 23/42* (2006.01)
*C09C 1/48* (2006.01)

(52) U.S. Cl.
CPC ............ *H01M 4/96* (2013.01); *H01M 8/10* (2013.01); *C01P 2004/64* (2013.01); *C01P 2006/12* (2013.01); *C01P 2006/14* (2013.01); *C01P 2006/16* (2013.01); *C09C 1/48* (2013.01); *Y02P 70/50* (2015.11)

(56) References Cited

OTHER PUBLICATIONS

Feb. 7, 2017 International Search Report issued in International Patent Application No. PCT/JP2016/085131.
Jul. 18, 2019 Extended Search Report issued in European Patent Application No. 16870585.3.
Park, Young-Chul et al., "Effects of Carbon Supports on PT Distribution, Ionomer Coverage and Cathode Performance for Polymer Electrolyte Fuel Cells", Journal of Power Source, vol. 315, pp. 179-191 (Mar. 21, 2016).

* cited by examiner

CARBON BLACK, ELECTRODE CATALYST AND FUEL CELL USING SAME, AND METHOD FOR PRODUCING CARBON BLACK

TECHNICAL FIELD

The present invention relates to carbon black, an electrode catalyst and fuel cell using the same, and a method for producing carbon black.

BACKGROUND ART

Fuel cells are formed such that electrode catalyst layers and an electrolyte membrane are sandwiched between separators on which paths for gases such as hydrogen and oxygen are provided. An electrode catalyst layer comprises a catalyst support (hereinafter also referred to as "support"), an ionic conductor such as an ionomer, and a catalyst. Examples of electrode catalyst layers of such a structure include those using carbon black which excels in gas diffusivity and electrical conductivity as the catalyst support, a fluorine polymer as an ionic conductor, and an electrode reaction-promoting platinum-based catalyst such as platinum or an alloy of platinum and another metal as a catalyst.

In order to improve the power of a fuel cell, the electrode reaction needs to be promoted. In order to promote the electrode reaction, first, it is effective to carry the catalyst on the support in a highly dispersed state. A high-specific-surface-area carbon black is used as a catalyst support that satisfies this requirement.

Carbon blacks usually have a specific surface area of 10 to 300 $m^2/g$ at the point of being generated from a hydrocarbon gas etc. This specific surface area almost completely depends on the primary particle diameter of carbon black alone, and the smaller the primary particle diameter is, the larger the specific surface area is. Additionally, by heat treating carbon black after generation at a temperature of at least 500° C. using air, oxygen and vapor etc. to corrode a part of the carbon black particles, the specific surface area can be increased to at least 300 $m^2/g$ (Patent Document 1). Such a treatment is called oxidation treatment or activation treatment. Carbon black made by an activation treatment has a high specific surface area of 300 to 1400 $m^2/g$ due to roughening of the particle surface, and can therefore carry the catalyst in a highly dispersed state.

However, the high-specific-surface-area carbon black made by the activation treatment, due to the marked increase or enlargement of pores in the primary particles, had the problem of the carried catalyst particles being buried inside the pores, the catalyst not effectively functioning in the electrode reaction increasing, and the power per catalyst weight decreasing.

There upon, a technique has been proposed to control the pore volume distribution of the support, thereby suppressing the burying of the carried catalyst inside the pores of the support and improving the power per catalyst weight (Patent Document 2). According to Patent Document 2, by using a support wherein pores having a pore diameter of at most 10 nm have a cumulative pore volume of at most 2% relative to the support volume, it is possible to prevent the catalyst particles from being buried in the pores of the support. However, in that case, there is a problem of a marked decrease in the specific surface area of the support, which makes carrying the catalyst in a highly dispersed state difficult.

Further, since the electrode reaction proceeds at a three-phase interface in the presence of the catalyst, ionic conductor, and reaction gas such as hydrogen or air, in order to promote the electrode reaction, it is necessary to design the structure of the electrode catalyst including the coating state of the ionic conductor on the support, not only the structure between the catalyst and the support. In other words, even if the catalyst is carried on the support in a highly dispersed state, if there is no ionic conductor at all, the electrode reaction materials, i.e., hydrogen ions or hydroxide ions, are not supplied to the reaction site. Conversely, if the support is very heavily coated by the ionic conductor, the electrode reaction materials, i.e., hydrogen gas or oxygen gas, are not supplied to the reaction site. In this case, a three-phase interface is not formed, and the electrode reaction cannot be promoted, so a high-power fuel cell cannot be obtained.

Patent Document 1 JP 2007-112660 A
Patent Document 2 JP 2007-220384 A

SUMMARY OF THE INVENTION

The present invention provides carbon black for an electrode catalyst support, capable of improving the power of a fuel cell, and an electrode catalyst and a solid polymer fuel cell using the same.

Provided are carbon black wherein pores which are at most 6 nm in pore diameter have a cumulative pore volume of less than 0.25 $cm^3/g$, a specific surface area by BET is 500 to 900 $m^2/g$, and a volatile matter content is 1.0 to 10.0%; an electrode catalyst for a fuel cell, formed from the carbon black; and a solid polymer fuel cell having the electrode catalyst.

MODES FOR CARRYING OUT THE INVENTION

One embodiment of the present invention shall be explained in detail below. The present invention is not limited to the following embodiment, and can be carried out with appropriate modifications so long as the effects of the present invention are not hindered.

The present inventors, while diligently researching electrode catalyst structures capable of promoting the electrode reaction of fuel cells and improving fuel cell performance, discovered that by using carbon black having a high specific surface area and few pores in the primary particles as the support, the catalyst carried thereby is not buried inside the pores of the support. Further research revealed that when there is at least a certain amount of surface functional groups on carbon black, the support surface is evenly coated by an ionomer, making it possible to produce an electrode catalyst wherein a most balanced reaction site is formed and which is capable of promoting electrode reaction.

[Carbon Black]

Figure 1:
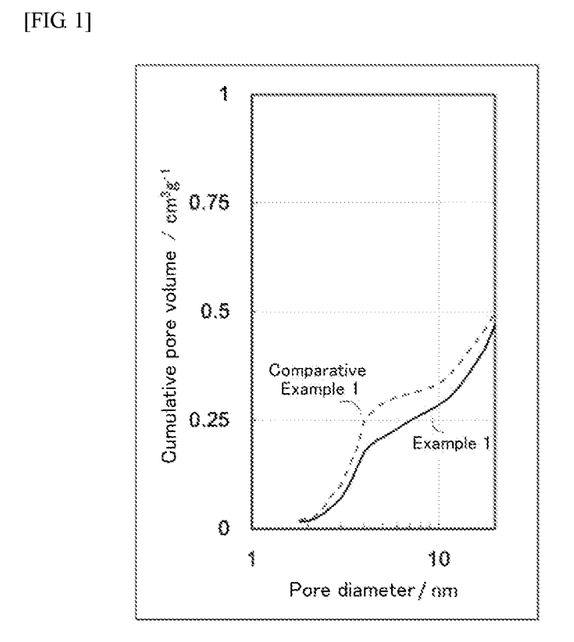
FIG. 1 is an explanatory graph showing the cumulative pore volumes of catalyst supports.

The carbon black has pores. Among the pores, those that are at most 6 nm in pore diameter have a cumulative pore volume of less than 0.25 cm$^3$/g. The pore diameter for the carbon black used as the support is made at most 6 nm based on the pore distribution measurement results by nitrogen adsorption. That is, while researching optimization of the electrode catalyst structure, the present inventors discovered that for carbon black of which the specific surface area has been increased by the activation treatment, as shown in FIG. 1, an increase in the cumulative pore volume of pores which are at most 6 nm in pore diameter leads to a higher frequency of the catalyst particles carried by the carbon black support being buried. As such, by making the cumulative pore volume of pores that are at most 6 nm in pore diameter less than 0.25 cm$^3$/g, it is possible to prevent the catalyst particles from being buried in the support, resulting in an electrode catalyst having a high effective utilization ratio of the catalyst under fuel cell operation conditions, and enabling the production of a high-power fuel cell. Moreover, as a result thereof, the amount of the costly platinum catalyst used can be reduced, so it is possible to produce a solid polymer fuel cell at low costs. Conversely, when the cumulative pore volume of pores that are at most 6 nm in pore diameter is 0.25 cm$^3$/g or greater, the frequency of the carried catalyst particles being buried becomes notably high, the catalyst effectively functioning in the electrode reaction decreases, and the power per catalyst weight is reduced.

Additionally, the "diameter" and "cumulative pore volume" herein refer to values measured by BJH at a measurement temperature of 77.4 K using nitrogen gas as the adsorbate with a gas adsorption amount measuring device ("Autosorb-iQ-MPXR" made by Quantachrome Instruments).

Figure 2:
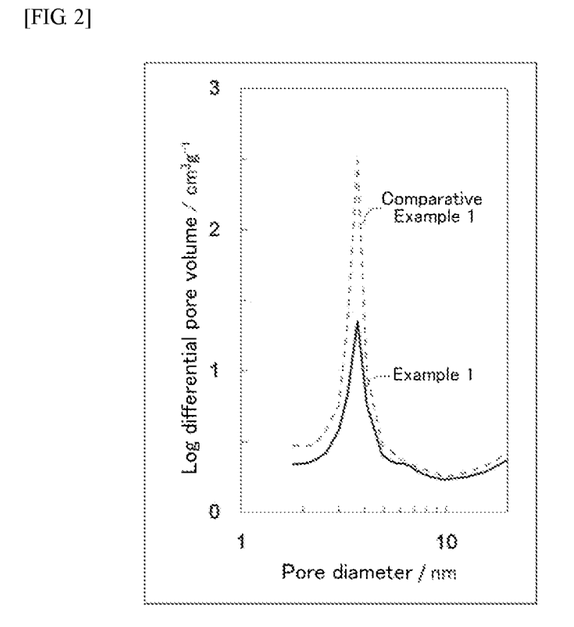
FIG. 2 is an explanatory graph showing the log differential pore volume distributions of catalyst supports.

The above-mentioned carbon black, as shown in the log differential pore volume distribution of FIG. 2, has a reduced peak in the log differential pore volume for pore diameters of 2 to 6 nm, and can be said to have a small volume of pores that are at most 6 nm in pore diameter. With regard to log differential pore volume distribution, the smaller the variation in pore volume is with respect to pore diameter between two consecutive points, the more the log differential pore volume decreases. The present inventors discovered that for carbon black of which the specific surface area has been increased by the activation treatment, a greater peak in the log differential pore volume for pore diameters of 2 to 6 nm is associated with a higher frequency of the catalyst particles carried by the carbon black support being buried. As such, by decreasing the peak in the log differential pore volume for pore diameters of 2 to 6 nm, it is possible to prevent the catalyst particles from being buried in the support.

Figure 3:
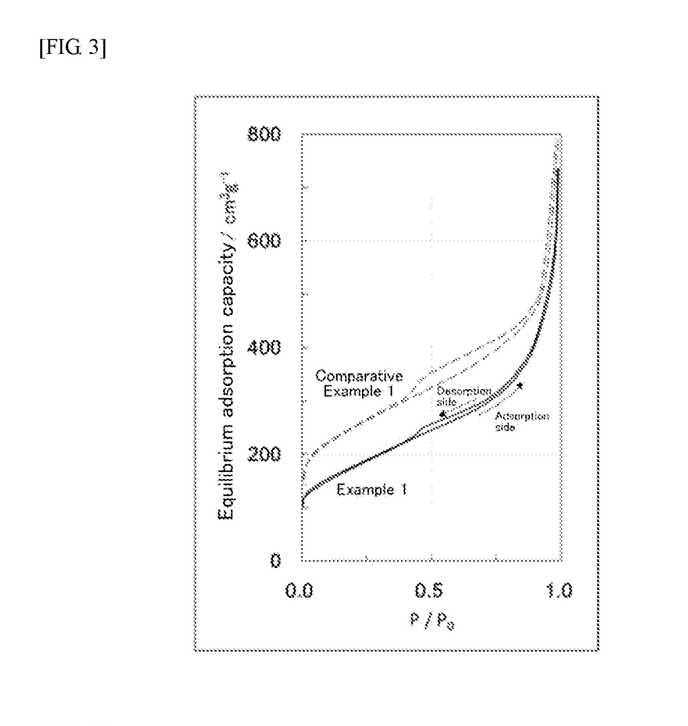
FIG. 3 is an explanatory graph showing the nitrogen adsorption/desorption isothermal lines of catalyst supports.
Figure 4:
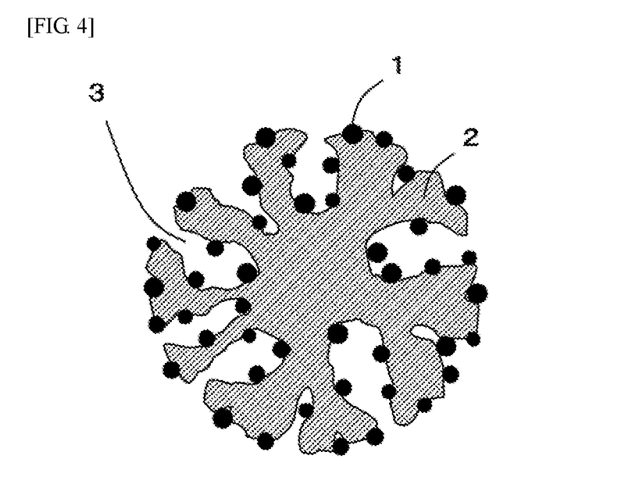
FIG. 4 is a schematic drawing showing a conventional electrode catalyst.
Figure 5:
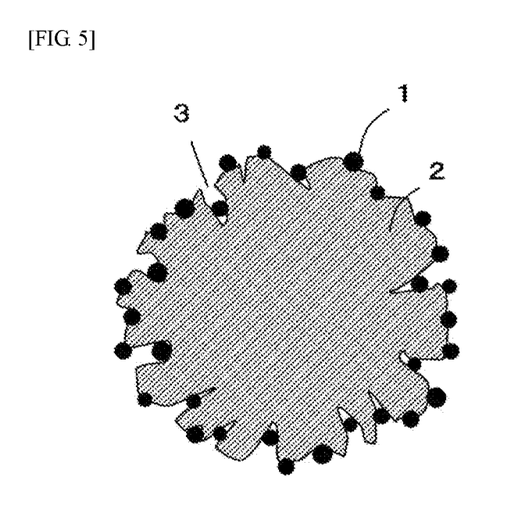
FIG. 5 is a schematic drawing showing an electrode catalyst of the present invention.

Moreover, the above-mentioned carbon black, as shown in FIG. 3, has a small hysteresis variation range on the nitrogen adsorption/desorption isothermal line, and the increase rate of the equilibrium adsorption capacity on the desorption side with respect to the equilibrium adsorption capacity on the adsorption side at equal pressure is less than 6%. According to the International Union of Pure and Applied Chemistry (hereinafter referred to as "IUPAC"), nitrogen adsorption/desorption isothermal lines represent the hysteresis of a porous substance dependent on the porous structure. That is because the irreversible processes of condensation and evaporation occur in the adsorption/desorption of gases by the pores. The relationships between pore structure models and hysteresis shapes have been categorized by IUPAC. For example, in carbon black primary particles having a large hysteresis variation range, there are many ink-bottle or cylindrical pores (hereinafter also referred to as "cavitation"). As such, as shown in FIG. 4, this can induce burial of the catalyst particles. In the case of the carbon black of the present embodiment, the hysteresis variation range on the nitrogen adsorption/desorption isothermal line is small while the specific surface area is as high as 500 to 900 m$^2$/g, and cavitation is remarkably low. For that reason, the outer surface of the support can be said to carry many catalyst particles, as shown in FIG. 5.

The carbon black has a specific surface area of 500 to 900 m$^2$/g, more preferably 750 to 900 m$^2$/g. The specific surface area can be measured by BET according to JIS K6217-2. When the specific surface area of the carbon black is less than 500 m$^2$/g, the portions carrying the catalyst decrease notably, making it impossible to carry the catalyst in a highly dispersed state. Meanwhile, when the specific surface area exceeds 900 m$^2$/g, due to particle corrosion by the activation treatment, the pores in the particles notably increase or are enlarged, and the frequency of the carried catalyst particles being buried inside the pores increases. When the proportion of catalyst particles buried inside the pores increases, the amount of catalyst effectively functioning under fuel cell reaction conditions decreases, and the power decreases. The specific surface area of the carbon black can be made higher by subjecting the raw material carbon black to an activation treatment. The activation treatment process will be described below. The lower limit of the specific surface area can be at least 600 m$^2$/g, or at least 700 m$^2$/g, and the upper limit can be at most 850 m$^2$/g.

The carbon black has a volatile matter content of 1.0 to 10.0%, more preferably 3.0 to 7.0%. The volatile matter content is an index for evaluating the amount of surface functional groups present on carbon black. The volatile matter content can be measured from a change in weight when heat treating, at 950° C. for five minutes in vacuum, a sample which has been preliminarily dried at 105° C. for one hour to remove moisture. The present inventors found, as a result of diligently researching to optimize the electrode catalyst structure, that the amount of surface functional groups on carbon black affects the coating state of the ionomer on the surface of carbon black particles. That is, when the volatile matter content is less than 1.0%, the ionomer does not coat the entirety of the carbon black particles evenly, hydrogen ions or hydroxide ions are not supplied even where the catalyst is present, and the three-phase interface decreases. Meanwhile, when the volatile matter content exceeds 10%, the ionomer forms a very thick coat on the carbon black surface, so the reaction gas such as oxygen or hydrogen is not supplied on the catalyst, and the three-phase interface decreases. When the three-phase interface decreases, the electrode reaction is not promoted, and the power per catalyst weight decreases. The volatile matter content can have a lower limit of at least 1.5%, 2.0%, or 4.0%. The upper limit can be at most 9.5%, at most 9.0%, or at most 8.0%.

Examples of the surface functional group present on carbon black include oxygen-containing functional groups such as phenolic hydroxyl group, ether group, carboxyl group, carbonyl group, and lactone group. One means to evaluate the surface functional group species present on carbon black is the temperature-programmed desorption (TPD) method. The TPD method measures the amounts of CO, $CO_2$ and $H_2O$ desorbed when a preliminarily dried sample is heated at a constant temperature rising rate in an inert atmosphere, and surface functional group species can be estimated from the profiles of obtained desorption temperature and desportion gas amount. From the TPD measurement results, it is understood that oxygen-containing functional groups such as phenolic hydroxyl group, ether group, carboxyl group, carbonyl group, and lactone group are present on the carbon black of the present embodiment.

The above-mentioned carbon black has a high specific surface area and excellent pore properties. That is, it has excellent pore volume distribution of the catalyst support, specific surface area, and balanced coverage on the support by the ionic conductor, and is capable of promoting the electrode reaction. As such, using this carbon black as an electrode catalyst support used in fuel cells can improve the power of fuel cells to a level above that of conventional products.

[Method for Producing Carbon Black]

The method for producing carbon black has a step of subjecting a raw material carbon black to an activation treatment. The method for producing the raw material carbon black is not particularly limited. For example, carbon black can be made by supplying a raw material gas such as a hydrocarbon from a nozzle provided on the top of a reactor, and carrying out a thermal decomposition reaction or partial combustion reaction, and then collected from a bag filter directly coupled to a lower portion of the reactor. The raw material gas used is not particularly limited, and gaseous hydrocarbons such as acetylene, methane, ethane, propane, ethylene, propylene, and butadiene, and gasified products of oil-form hydrocarbons such as toluene, benzene, xylene, gasoline, kerosene, light oil, and heavy oil can be used. Alternatively, a mix of a plurality of the above can be used.

The raw material carbon black, in particular, is preferably acetylene black wherein an acetylene gas is a main raw material. Acetylene black is a carbon black generated by a self-heating decomposition reaction of the acetylene gas, and the flame temperature due to this heating decomposition exceeds 2000° C. As such, acetylene black has very high crystallinity, and crystallites called pseudographite structures extend into the particles. Meanwhile, types of carbon black other than acetylene black include channel black, thermal black, lamp black, and Ketjenblack. Since these species use petroleum or natural gas as a raw material, the flame temperature when synthesizing carbon black is low, and crystallinity is hard to improve. As such, there are many non-crystalline portions in these carbon black particles. In the activation treatment which increases the specific surface area of carbon black, the portions with low crystallinity in the carbon black particles may be preferentially corroded and made porous. As such, in cases where a low-crystallinity carbon black such as channel black, thermal black, lamp black or Ketjenblack is subjected to the activation treatment to increase the specific surface area, sometimes not only the particle surface, but also the interior thereof, is corroded, the pores in the particle increase or are enlarged, and the frequency of the catalyst carried thereby being buried in the pores becomes high, so the amount of catalyst effectively functioning in the electrode reaction may decrease, and the power per catalyst weight may markedly decrease.

The primary particle diameter of the raw material carbon black is 10 to 20 nm, more preferably 15 to 19 nm. By making the primary particle diameter at most 20 nm, a high specific surface area of at least 500 m$^2$/g can be achieved under mild conditions. As a result thereof, a high specific surface area can be achieved while suppressing increase or enlargement of pores in the primary particle. When the primary particle diameter exceeds 20 nm, harsher conditions are needed to corrode the carbon in order to obtain a high specific surface area, and in that case, together with the high specific surface area, the pores increase or are enlarged markedly. Meanwhile, when the primary particle diameter is so small as to be less than 10 nm, the particles tend to aggregate and cannot be dispersed, making it difficult to carry the catalyst by a liquid-phase method.

Additionally, the average primary particle diameter can be obtained by measuring the diameters of 100 carbon black primary particles from images of a transmission electron microscope (TEM) and calculating the average. The primary particles of carbon black have a small aspect ratio and a shape close to a true sphere, but are not completely true spheres. Accordingly, the greatest of segments connecting two points on the primary particle circumference in a TEM image is made the primary particle diameter of the carbon black.

(Activation Treatment)

The activation treatment of carbon black is characterized in that a gas having an oxygen concentration of 1.0 to 5.0 volume % is supplied to a furnace. When the oxygen concentration exceeds 5 volume %, the carbon corrosion reaction is promoted, which increases or enlarges the pores which are 2-6 nm in pore diameter in the carbon black particles. Meanwhile, when the oxygen concentration is less than 1 volume %, the carbon corrosion reaction does not occur for all practical purposes, and it becomes difficult to increase the specific surface area. The gas supplied can be air or vapor that has been diluted by an inert gas such as nitrogen or argon gas. The mixing ratio of these gases is not particularly limited. For example, they can be mixed to achieve a volume ratio of nitrogen to air of 4:1. The activation treatment is generally carried out at 500 to 1000° C., but in the case of the present embodiment, the treatment is preferably carried out at a temperature of 500 to 700° C. to maintain a high productivity.

[Electrode Catalyst for a Fuel Cell]

The electrode catalyst for a fuel cell (hereinafter simply referred to as "electrode catalyst") comprises a support containing the above-mentioned carbon black. Regarding the catalyst particles in this electrode catalyst, at least 60% of the entire quantity of the catalyst particles carried by the support is present on the outer surface of the support. The number abundance of the above-mentioned catalyst particles on the outer surface of the support can be evaluated by a scanning transmission electron microscope (STEM) equipped with a rotary sample holder. That is, the number abundance of the catalyst particles on the outer surface of the support can be calculated from SEM and TEM images of the electrode catalyst observed by making a 360° rotation of the sample holder. The number of the catalyst particles carried on the outer surface of the support is measured using the SEM image, and the number of the catalyst particles carried by the outer and inner portions of the support is measured using the TEM image to calculate a proportion of the number of catalyst particles carried on the outer surface of the support with respect to the entire quantity. The number abundance of the catalyst particles on the outer surface of the support is at least 60%, and the number abundance in conventional electrode catalysts is less than 50%. As such, the electrode catalyst of the present embodiment has a large amount of catalyst functioning in the electrode reaction, and the effective utilization ratio of the catalyst is high. As a result thereof, the power per catalyst weight of the fuel cell is high. Moreover, to increase the amount of catalyst effectively functioning in the electrode reaction, the number abundance of the catalyst particles on the outer surface of the support is most preferably 100%.

(Method for Producing the Electrode Catalyst)

The method for producing the electrode catalyst is not particularly limited, and the method below is provided as an example where the catalyst is platinum. A platinum-carrying carbon black can be produced by, firstly adding, to a solution wherein the carbon black support has been suspended in water, an aqueous hexachloroplatinic (IV) acid solution such that the platinum catalyst is 50 parts by mass with respect to the support to form a mixture solution A, further adding sodium borohydride at 10 times equivalent with respect to hexachloroplatinic acid (reduction treatment), depositing the platinum particles on the carbon black surface, then filtering, washing, and drying. Next, as the ionomer, Nafion (made by DuPont) is added to achieve 70 parts by mass with respect to the support, and using a ball mill, the platinum-carrying carbon black, Nafion, ethanol, and pure water were blended and mixed for 30 minutes to obtain a catalyst ink. Further, an electrode catalyst layer can be made by directly spraying the catalyst ink on an electrolyte membrane, and drying at 60° C.

[Solid Polymer Fuel Cell]

The solid polymer fuel cell has the above-mentioned electrode catalyst for a fuel cell (hereinafter simply referred to as "electrode catalyst"). The above-mentioned electrode catalyst has a high effective utilization ratio of the catalyst, so the solid polymer fuel cell having the electrode catalyst has high power properties. The method for producing a solid polymer fuel unit cell using the electrode catalyst is not particularly limited, and for example, the unit cell can be made as follows. With a Nafion membrane as the electrolyte membrane, an electrode catalyst layer (cathode) of the present embodiment is made on one face of the electrolyte membrane by the above-mentioned method, an electrode catalyst layer (anode) is made on the other face using a commercially available platinum-carrying carbon black ("TEC10E50E" made by Tanaka Holdings Co., Ltd.) using a method similar to the above-mentioned method, and thermocompression bonding is carried out with a hot press at 140° C. and 1.0 MPa to obtain a membrane electrode assembly (MEA). Further, once the two faces of the MEA are sandwiched by carbon paper, separators, and subsequently current collectors, a solid polymer fuel unit cell is completed, and if an electronic load device and a gas supply device are connected thereto, the fuel cell can be evaluated.

For example, based on the measurement results of the current-voltage characteristics of the fuel unit cell, a maximum power per platinum catalyst weight (W/mg-Pt) can be calculated and used as a maximum cell power to be evaluated. The maximum cell power of conventional fuel cells was less than 12.5 W/mg-Pt, but it is preferably at least 14.5 W/mg-Pt, and more preferably at least 15.0 W/mg-Pt.

Further, based on the measurement results obtained by changing the gas supplied to the cathode from pure oxygen to air, keeping the other conditions the same, and measuring the current-voltage characteristic, a difference between voltage values at a constant current value, between the case where pure oxygen was supplied to the cathode and the case where air was supplied, can be used as $O_2$ gain to be evaluated. The $O_2$ gain is an indicator representing the efficiency of a cathode reaction (oxygen reduction reaction), and the more efficiently an electrode catalyst structure functions in a cathode reaction, the smaller the $O_2$ gain value is. The $O_2$ gain value of conventional fuel cells is at least 0.12, but it is preferably at most 0.1, and more preferably at most 0.095.

According to the present embodiment, a carbon black for an electrode catalyst support, capable of improving the power of a fuel cell, and an electrode catalyst and a solid polymer fuel cell using the same can be provided.

EXAMPLES

The present invention shall be explained in more detail by referring to the examples below, but interpretation of the present invention is not to be limited by these examples.

Example 1

Using thermal decomposition with an acetylene gas as a main raw material, a carbon black wherein pores which are at most 6 nm in pore diameter have a cumulative pore volume of 0.12 cm$^3$/g, a specific surface area is 291 m$^2$/g, an average primary particle diameter is 18 nm, and a volatile matter content is 0.95% was made, and this carbon black was subjected to an activation treatment under the conditions of a heating temperature of 700° C. and an oxygen concentration of 2.0% to obtain a carbon black wherein pores which are at most 6 nm in pore diameter have a cumulative pore volume of 0.23 cm$^3$/g, a specific surface area is 837 m$^2$/g, and a volatile matter content is 4.3%. The obtained carbon black was measured for the following physical properties. The evaluation results are shown in Table 1.

(Pore volume distribution)

Using a gas adsorption amount measuring device ("Autosorb-iQ-MPXR" made by Quantachrome Instruments) and a nitrogen gas as the adsorbate, measurement was carried out by BJH at a measurement temperature of 77.4 K.

(Specific Surface Area)

Measurements were made in accordance with JIK K 6217-2.

(Average Primary Particle Diameter)

From 50,000 times magnified images of a transmission electron microscope (HD-2700 made by Hitachi, Ltd.), the diameters of 100 carbon black primary particles were measured, and an average value was calculated.

(Volatile Matter Content)

A change in weight was measured when heat treating, at 950° C. for five minutes in vacuum, a carbon black sample which has been preliminarily dried at 105° C. for one hour to remove moisture.

The obtained carbon black was mixed with an aqueous hexachloroplatinic acid solution. The mixing ratio, in mass ratio, of carbon black to platinum was 50/50. The mixture solution was blended for 30 minutes at 80° C., then cooled to room temperature. A platinum-carrying carbon black (electrode catalyst) was obtained by adding a sodium borohydride solution at 5-6 equivalents with respect to hexachloroplatinic acid, depositing the platinum, filtering, washing, and then drying. The obtained electrode catalyst was measured for the following physical properties. The evaluation results are shown in Table 1.

(Number Abundance of Catalyst Particles on the Outer Surface of the Support)

A scanning transmission electron microscope (HD-2700 made by Hitachi, Ltd.) was used to obtain electron microscope images at an acceleration voltage of 80 kV. The sample holder was rotated, the number of the catalyst particles carried on the outer surface of the support was measured from the SEM images, and the number of the catalyst particles carried on the outer and inner portions of the support was measured from TEM images to calculate a proportion of the number of catalyst particles carried on the outer surface of the support with respect to the entire quantity. Moreover, 100 carbon black primary particles were measured to calculate an average value.

To the obtained electrode catalyst, Nafion (ionic conductor) was mixed to achieve a mass ratio of carbon black to Nafion of 100/70 and to form a paste, which was spray coated on an electrolyte membrane, then dried at 60° C. to form a cathode. Moreover, to a commercially available platinum-carrying carbon black ("TEC10E50E" made by Tanaka Holdings Co., Ltd.), Nafion was mixed to achieve a mass ratio of carbon black to Nafion of 100/70 to form a paste, which was spray coated on the electrolyte membrane, then dried at 60° C. to form an anode. Further, this was hot pressed for three minutes at 140° C. and 1.0 MPa to obtain an MEA. The obtained MEA was sandwiched and integrated with carbon paper, separators, and current collectors to form a fuel unit cell.

(Maximum Cell Power)

Next, the current-voltage characteristics of this fuel unit cell were measured under the conditions of 80° C. and 1 atm. At this point, the anode was supplied with a pure hydrogen gas and the cathode was supplied with a pure oxygen gas, and each gas was made to have a humidity of 80%. Based on the obtained measurement results, a maximum power per platinum catalyst weight (W/mg-Pt) was calculated. The evaluation results are shown in Table 1.

($O_2$ Gain)

Moreover, the gas supplied to the cathode was changed from pure oxygen to air, the other conditions were kept the same, and the current-voltage characteristics were measured in the same way as above. Based on the obtained measurement results, a difference in the voltage values at a constant current value (1.0 A/cm$^2$), between the case where pure oxygen was supplied to the cathode and the case where air was supplied, was evaluated. This difference between voltages is called $O_2$ gain. The $O_2$ gain is an indicator representing the efficiency of a cathode reaction (oxygen reduction reaction), and the more efficiently an electrode catalyst structure functions in a cathode reaction, the smaller the $O_2$ gain value is. The evaluation results are shown in Table 1.

Comparative Example 1

Using a commercially available carbon black ("Ketjenblack EC300J" made by Lion Corporation), an electrode catalyst and a fuel unit cell were made and evaluated by the same methods as Example 1. The evaluation results are shown in Table 2.

Comparative Example 2

Using a commercially available carbon black ("Vulcan XC-72" made by Cabot Corporation), an electrode catalyst and a fuel unit cell were made and evaluated by the same methods as Example 1. The evaluation results are shown in Table 2.

Comparative Example 3

Using a graphitized carbon black obtained by graphitization under the conditions of 2000° C. and a nitrogen gas atmosphere, an electrode catalyst and a fuel unit cell were made and evaluated by the same methods as Example 1. The evaluation results are shown in Table 2.

Examples 2-6 and Comparative Examples 4-8

The physical properties of the raw material carbon blacks and the activation treatment conditions to obtain the carbon blacks were changed to the conditions shown in Tables 1 and 2, but otherwise these examples were carried out in the same manner as Example 1 to make and evaluate electrode catalysts and fuel unit cells. The evaluation results are shown in Tables 1 and 2.

TABLE 1

|  | Unit | Ex. 1 | Ex. 2 | Ex. 3 | Ex. 4 | Ex. 5 | Ex. 6 |
| --- | --- | --- | --- | --- | --- | --- | --- |
| <Physical properties of raw material carbon black> Cumulative pore volume of pores that are at most 6 nm in diameter | cm$^3$/g | 0.12 | 0.10 | 0.11 | 0.09 | 0.12 | 0.12 |
| Specific surface area | m$^2$/g | 291 | 269 | 294 | 185 | 287 | 294 |
| Average primary particle diameter | nm | 18 | 18 | 18 | 18 | 18 | 19 |
| Volatile matter content | % | 0.95 | 1.33 | 1.43 | 2.52 | 3.41 | 0.63 |
| <Physical properties of carbon black support> Cumulative pore volume of pores that are at most 6 nm in diameter | cm$^3$/g | 0.23 | 0.24 | 0.24 | 0.14 | 0.20 | 0.22 |
| Specific surface area | m$^2$/g | 837 | 819 | 896 | 527 | 792 | 845 |
| Average primary particle diameter | nm | 18 | 18 | 18 | 18 | 18 | 19 |
| Volatile matter content | % | 4.31 | 5.13 | 6.15 | 5.64 | 9.33 | 1.54 |
| <Activation treatment conditions> Heating temperature | ° C. | 700 | 700 | 700 | 600 | 550 | 650 |
| Oxygen concentration | volume % | 2.0 | 4.0 | 3.0 | 2.0 | 4.5 | 1.5 |
| <Electrode catalyst characteristics> Abundance of catalyst particles on outer surface of support | % | 71 | 64 | 67 | 74 | 68 | 69 |
| <Fuel cell characterists> Maximum cell power | W/mg-Pt | 15.3 | 15.0 | 14.8 | 15.1 | 14.9 | 14.7 |
| $O_2$ gain | V | 0.075 | 0.081 | 0.084 | 0.090 | 0.083 | 0.086 |

TABLE 2

| | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| <Physical properties of raw material carbon black> Cumulative pore volume of pores that are at most 6 nm in diameter | $cm^3/g$ | — | — | — | 0.11 | 0.10 | 0.21 | 0.17 | 0.23 |
| Specific surface area | $m^2/g$ | — | — | — | 137 | 293 | 288 | 254 | 173 |
| Average primary particle diameter | nm | 25 | 37 | 18 | 18 | 18 | 18 | 18 | 18 |
| Volatile matter content | % | — | — | — | 1.90 | 6.74 | 0.61 | 3.29 | 2.56 |
| <Physical properties of carbon black support> Cumulative pore volume of pores that are at most 6 nm in diameter | $cm^3/g$ | 0.31 | 0.30 | 0.07 | 0.24 | 0.23 | 0.52 | 0.24 | 0.45 |
| Specific surface area | $m^2/g$ | 814 | 239 | 156 | 420 | 752 | 859 | 924 | 454 |
| Average primary particle diameter | nm | 25 | 37 | 18 | 18 | 18 | 18 | 18 | 18 |
| Volatile matter content | % | 0.67 | 0.54 | 0.03 | 3.76 | 11.54 | 4.78 | 9.91 | 5.72 |
| <Activation treatment conditions> Heating temperature | °C. | — | — | — | 400 | 400 | 700 | 900 | 500 |
| Oxygen concentration | volume % | — | — | — | 5.0 | 20.9 | 20.9 | 15.0 | 10.0 |
| <Electrode catalyst characteristics> Abundance of catalyst particles on outer surface of support | % | 49 | 72 | 62 | 67 | 62 | 33 | 44 | 54 |
| <Fuel cell characterists> Maximum cell power | W/mg-Pt | 12.1 | 12.2 | 11.0 | 10.5 | 11.5 | 8.4 | 9.1 | 11.5 |
| $O_2$ gain | V | 0.159 | 0.124 | 0.139 | 0.167 | 0.201 | 0.184 | 0.180 | 0.168 |

Based on Table 1, the carbon black according to the present invention had a small cumulative pore volume of pores which were at most 6 nm in pore diameter, so there were few pores in the primary particles, and due to the high specific surface area and the presence of a certain amount of surface functional groups, an electrode catalyst which was most balanced with respect to reaction site formation could be made, and an power higher than the conventional was shown in the evaluation of fuel cell performance.

INDUSTRIAL APPLICABILITY

The carbon black of the present invention can be used as a catalyst support for a solid polymer fuel cell.

DESCRIPTION OF REFERENCE NUMBERS

1 Catalyst
2 Support
3 Pore

The invention claimed is:

1. Carbon black comprising pores which are at most 6 nm in pore diameter having a cumulative pore volume of less than 0.25 $cm^3/g$,
    wherein a specific surface area of the carbon black by BET is 500 to 900 $m^2/g$,
    a volatile matter content of the carbon black is 1.0 to 10.0%, and
    a log differential pore volume for pores having a diameter in a range of 2 to 6 nm is 1.5 $cm^3/g$ or less.

2. The carbon black according to claim 1, wherein the specific surface area by BET is 750 to 900 $m^2/g$.

3. The carbon black according to claim 1, wherein the volatile matter content is 3.0 to 7.0%.

4. The carbon black according to claim 1, wherein the log differential pore volume for pores having the diameter in the range of 2 to 6 nm is less than a log differential pore volume for a reference carbon black having pores which are at most 6 nm in pore diameter having a cumulative pore volume of 0.25 $cm^3/g$ or more.

5. Carbon black comprising pores which are at most 6 nm in pore diameter having a cumulative pore volume of less than 0.25 $cm^3/g$,
    wherein a specific surface area of the carbon black by BET is 500 to 900 $m^2/g$,
    a volatile matter content of the carbon black is 1.0 to 10.0%, and
    a log differential pore volume for pores having a diameter in a range of 2 to 6 nm is less than a log differential pore volume for a reference carbon black having pores which are at most 6 nm in pore diameter having a cumulative pore volume of 0.25 $cm^3/g$ or more.

6. Carbon black having a cumulative pore volume of less than 0.25 $cm^3/g$ of pores which are at most 6 nm in pore diameter,
    wherein a specific surface area of the carbon black by BET is 500 to 900 $m^2/g$,
    a volatile matter content of the carbon black is 1.0 to 10.0%, and
    a log differential pore volume for pores having a diameter in a range of 2 to 6 nm is 1.5 $cm^3/g$ or less.

7. The carbon black according to claim 6, wherein the log differential pore volume for pores having the diameter in the range of 2 to 6 nm is less than a log differential pore volume for a reference carbon black having pores which are at most 6 nm in pore diameter having a cumulative pore volume of 0.25 $cm^3/g$ or more.

8. An electrode catalyst for a fuel cell, comprising a support formed from the carbon black according to claim 1.

9. The electrode catalyst for a fuel cell according to claim 8, wherein a catalyst number abundance on the support surface is at least 60% relative to the total number of catalyst particles carried by the support.

11. A production method for the carbon black according to claim 1, having an activation treatment step wherein a raw material carbon black having a primary particle diameter of at least 10 nm and at most 20 nm is contacted with a gas having an oxygen concentration of at least 1.0 volume % and at most 5.0 volume %.

10. A solid polymer fuel cell having the electrode catalyst according to claim 8.

12. The production method according to claim 11, wherein the activation treatment step is performed at at least 500° C. and at most 700° C.

13. A solid polymer fuel cell having the electrode catalyst according to claim 9.

* * * * *